United States Patent [19]
Schultz

[11] 3,784,336
[45] Jan. 8, 1974

[54] POWER TRANSMISSION
[75] Inventor: Richard Allen Schultz, St. Clair Shores, Mich.
[73] Assignee: Sperry Rand Corporation, Troy, Mich.
[22] Filed: Dec. 10, 1971
[21] Appl. No.: 206,845

[52] U.S. Cl. ............................................ 418/61
[51] Int. Cl. ........................................ F01c 1/22
[58] Field of Search ................ 418/61; 74/462, 804

[56] References Cited
UNITED STATES PATENTS

| | | | |
|---|---|---|---|
| 1,347,671 | 7/1920 | Belshaw | 74/804 |
| 2,181,162 | 11/1939 | Zaenger | 74/804 UX |
| 3,389,618 | 6/1968 | McDermott | 418/61 X |
| 3,552,892 | 1/1971 | Woodling | 418/61 |
| 3,558,245 | 1/1971 | Bolduc | 418/61 |
| 3,232,134 | 2/1966 | Kluwe et al. | 74/462 |
| 3,547,565 | 12/1970 | Eddy | 418/61 |
| 3,597,128 | 8/1971 | Venable et al. | 418/61 |
| 3,453,966 | 7/1969 | Eddy | 418/61 UX |

Primary Examiner—Carlton R. Croyle
Assistant Examiner—Michael Koczo, Jr.
Attorney—Theodore Van Meter

[57] ABSTRACT

An orbital or compound displacement fluid motor has an internally lobed stator and an externally lobed rotor-orbitor with one lobe less than the number of lobes on the stator. An output shaft is journalled in the housing coaxially with the stator and a driving connection from the rotor-orbitor is provided by a single, very loose fitting spline drive providing direct driving contact from the rotor-orbitor to the shaft. This avoids the use of the inclined coupling shaft commonly used in orbital motors and provides greater durability at a lower production cost.

1 Claim, 4 Drawing Figures

POWER TRANSMISSION

Orbital or compound displacement fluid motors have come into extended use in hydraulic power transmissions having a rotary output moving at low speed and high torque relative to the pump of the system. They present the advantage of having a built-in speed reducing effect relative to their single cycle displacement and thus are compact and do not require additional speed reduction gearing. In such units as commonly constructed, there is an annular stator having internal lobes and an orbiting rotor-orbitor, the lobes of which are one less in number than the lobes of the stator. To establish the built-in speed reduction capability, it is necessary to transfer only the rotation and not the orbital motion of this member to the output shaft. This is customarily done by the provision of a wobble shaft usually having crown splines at each end engaging the rotor-orbitor and the output shaft respectively.

Such a device is the patent to Bolduc, U.S. Pat. No. 3,558,245, Jan. 26, 1971, the disclosure of which is incorporated in this specification as a part thereof. The torque capacities of units of this class are usually limited by the torque capacities of the crown splines or other universal connections at the ends of the wobble coupling shaft. Since crown splines transmit their torque through single point contact at each tooth, this results in high local stresses and limits the available torque if excessive wear is to be avoided.

The present invention aims to overcome these difficulties and to provide improved torque capacities and greater durability as well as to reduce the manufacturing costs of such a unit. With this objective, the invention comprises a fluid motor of the compound displacement type comprising a body having inlet and outlet cavities, an internally lobed stator, an externally lobed rotor-orbitor engaging the stator to provide a series of expansible chambers, a driveshaft journalled in the body coaxially with the base circle of the stator lobes, means incuding an internal spline in the rotor-orbitor, and an external spline on the shaft directly engaging the internal spline for transferring rotation but not orbital motion to the shaft, and means for communicating the flow of fluid between the expansible chambers and the inlet and outlet cavities.

Figure 1:
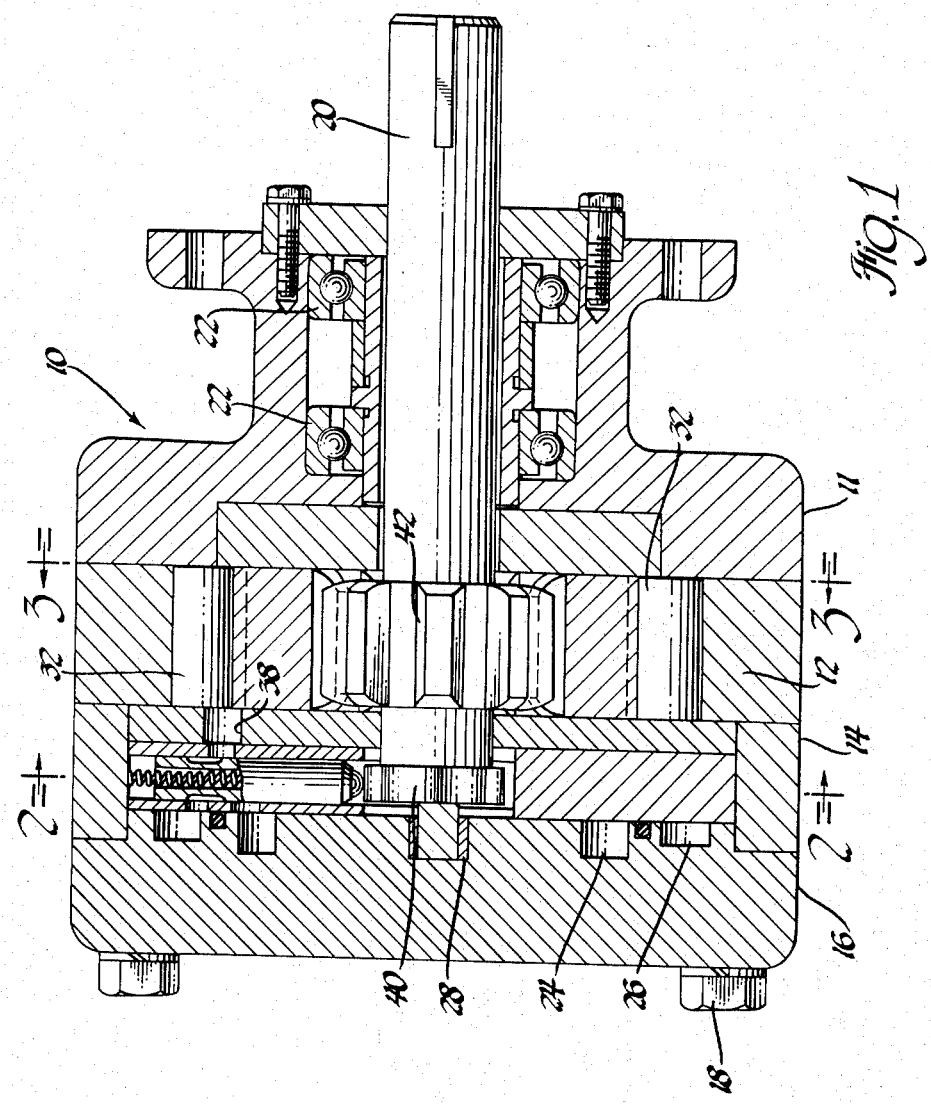
FIG. 1 is a longitudinal cross section of a fluid motor incorporating a preferred form of the present invention.

Referring now to FIG. 1, the motor has a body 10 consisting of sections 11, 12, 14 and 16 held together by through bolts 18. Section 11 journals a shaft 20 on bearings 22. Section 12 houses the fluid displacement mechanism comprising a stator and rotor-orbitor. Section 14 houses a commutating valve mechanism. Section 16 contains annular outlet and inlet passages 24 and 26 respectively and contains a pilot bearing 28 for the inner end of shaft 20.

Figure 3:
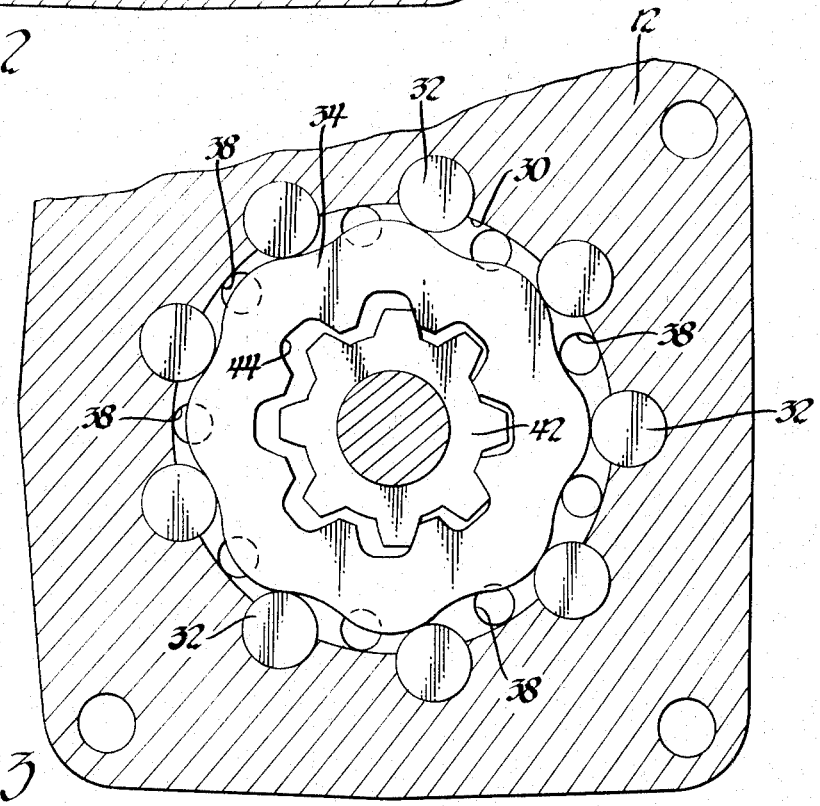
FIG. 3 is a cross section on line 3—3 of FIG. 1.

The fluid displacement mechanism is illustrated in FIG. 3 and comprises a stator formed by a large bore 30 in the section 12 and a series of lobes formed by pins or rollers 32 equally spaced around the bore 30. A rotor-orbitor 34 is fitted into the bore 30 and has a lobed contour with one less lobe than the number of lobes or pins 32 in the stator. It forms with the stator a plurality of expansible chambers to which fluid may be commutated to produce the orbital motion of member 34. In the example illustrated, there are nine stator lobes and eight rotor-orbitor lobes, resulting in a relation such that after nine cycles of orbital motion, a single cycle of rotation will have transpired and the rotor-orbitor will have returned to its starting position.

Figure 2:
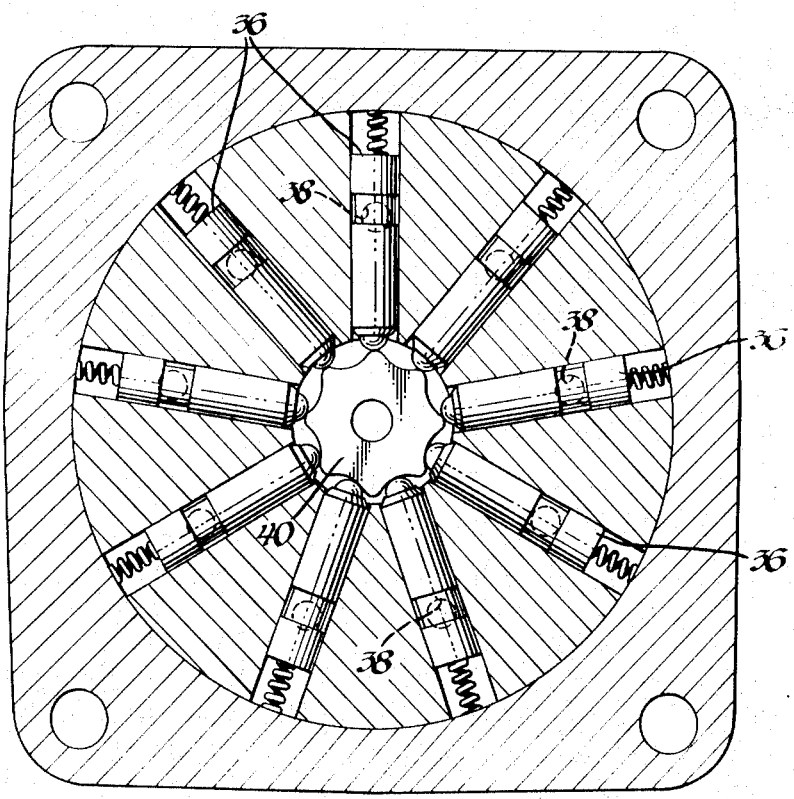
FIG. 2 is a cross section on line 2—2 of FIG. 1.

The fluid commutating means is illustrated in FIG. 2 and may be similar to that illustrated in FIG. 10 of the Bolduc patent. For example, the reciprocating three-way valves 36, one for each expansible chamber, communicate therewith through holes 38 which are alternately commutated between the inlet passage 26 and the outlet passage 24 in timed relation to the orbital motion cycle. The valves 36 are operated by a star-wheel 40 which may be formed as a part of the shaft 20.

The drive between the rotor-orbitor 34 and shaft 20 is established by a direct spline drive consisting of a male spline 42 on shaft 20 and a female spline 44 inside rotor-orbitor 34. This spline drive is an extremely loose fitting one and the number of teeth is preferably equal to the number of lobes on the rotor-nutator. Such a spline must provide at least one tooth contact at any time in the operating cycle.

Figure 4:
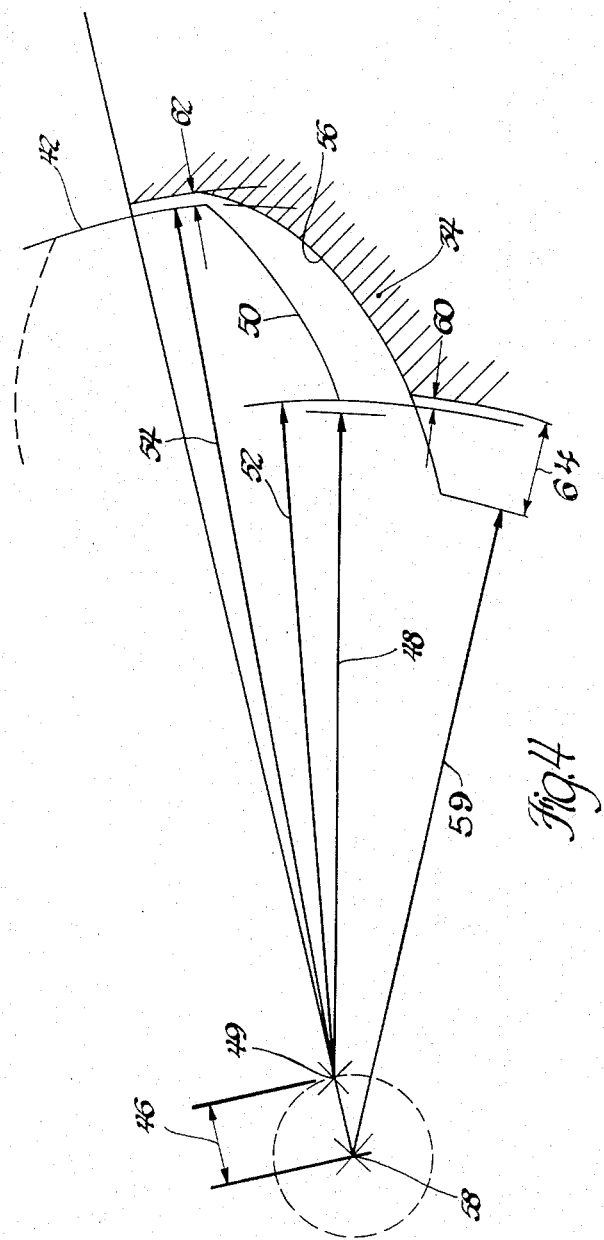
FIG. 4 is a plot of tooth profiles of a spline drive used in the present invention.

This can be accomplished by utilizing tooth profiles generated upon base circles which are indicated in FIG. 4. The base radius for the male spline tooth on the shaft is indicated at 48. This is based upon the center 49 which is the shaft axis and the axis of the stator bore 30. The male tooth profile indicated at 50 may be chosen, for example, as a 30° involute profile, the tooth having a base radius 48, a minor radius indicated at 52, and a major radius at 54. The profile 56 of the female spline in rotor-nutator 34 may be generated as that path which the tooth profile 50 partakes if it is orbitally moved with eccentricity 46 about the center 58 of the rotor-orbitor 34 while being held against rotation. The base radius 59 is equal to base radius 48. This results in a mating surface that will maintain a minimum of one tooth in driving contact at all times and that will avoid tooth interference. Root and tip clearances of normal magnitude for spline 42 are indicated at 60 and 62, and a very large clearance for the spline 44 is shown at 64.

The operation of the motor will be clearly understood from the Bolduc disclosure, the difference being that the rotary motion of the rotor-orbitor is transmitted directly to the shaft 20 through the splines 42-44. The tooth contact here is along the full width of the tooth and all rotation takes place about the output shaft axis. This results in a much sturdier construction. Since there is only one pair of spline teeth required and they utilize fewer and larger teeth, they may be produced on standard gear making machinery and the cost of construction is materially reduced.

I claim:

1. A fluid motor of the compound displacement type comprising a body having inlet and outlet cavities, an internally lobed stator, an externally lobed rotor-orbitor engaging the stator to provide a series of expansible chambers, a drive-shaft journalled in the body coaxially with the base circle of the stator lobes, means including an internal spline in the rotor-orbitor and an external spline on the shaft directly engaging the internal spline for transferring rotation but not orbital motion to the shaft, the splines having equal numbers of teeth with each internal spline tooth having a profile generated by the relative motion of an external spline tooth orbiting about the center of the rotor-orbitor with the eccentricity of orbital motion and means for communicating the flow of fluid between the expansible chambers and the inlet and outlet cavities.

* * * * *